United States Patent
Cao

(10) Patent No.: US 10,186,227 B2
(45) Date of Patent: Jan. 22, 2019

(54) CORNER CUT CIRCUIT IN LIQUID CRYSTAL PANEL DRIVING SYSTEM

(71) Applicant: Shenzhen China Star Optoelectronics Technology Co., Ltd., Shenzhen (CN)

(72) Inventor: Dan Cao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 218 days.

(21) Appl. No.: 15/110,190

(22) PCT Filed: May 6, 2016

(86) PCT No.: PCT/CN2016/081200
§ 371 (c)(1),
(2) Date: Jul. 7, 2016

(87) PCT Pub. No.: WO2017/156838
PCT Pub. Date: Sep. 21, 2017

(65) Prior Publication Data
US 2018/0144708 A1 May 24, 2018

(30) Foreign Application Priority Data
Mar. 18, 2016 (CN) .......................... 2016 1 0155912

(51) Int. Cl.
*G09G 3/36* (2006.01)
*G02F 1/1362* (2006.01)

(52) U.S. Cl.
CPC ......... *G09G 3/3696* (2013.01); *G02F 1/1362* (2013.01); *G09G 3/36* (2013.01); *G09G 3/3677* (2013.01)

(58) Field of Classification Search
CPC ...... G09G 3/3696; G09G 3/3677; G09G 3/36; G02F 1/1362
See application file for complete search history.

(56) References Cited

U.S. PATENT DOCUMENTS 9,230,502 B2    1/2016  Watanabe
2011/0273433 A1* 11/2011 Ahn ..................... G09G 3/3696
                                                        345/213

(Continued)

FOREIGN PATENT DOCUMENTS

CN    201716968      1/2011
CN    102280094 A   12/2011
(Continued)

OTHER PUBLICATIONS

International Search Report for PCT/CN2016/081200, Completed by the Chinese Patent Office dated Dec. 7, 2016, All together 12 Pages.

*Primary Examiner* — Srilakshmi K Kumar
*Assistant Examiner* — Brent D Castiaux
(74) *Attorney, Agent, or Firm* — Mintz Levin Cohn Ferris Glovsky and Popeo, P.C.; Kongsik Kim; Jhongwoo Jay Peck

(57) ABSTRACT

A corner cut circuit in a liquid crystal panel driving system, wherein the corner cut circuit includes: a controller to provide a first signal for a signal converter; a signal converter to convert the first signal to a second signal for controlling discharging of a discharge circuit, and to provide the second signal to the discharge circuit; and a discharge circuit to generate a corner cut voltage of the corner cut circuit according to the second signal provided by the signal converter. According to the corner cut circuit, a corner cut voltage can be automatically adjusted, a peripheral circuit is simplified, and the cost is reduced.

12 Claims, 3 Drawing Sheets

(56) References Cited

U.S. PATENT DOCUMENTS

2014/0145922 A1* 5/2014 Chen .................. G09G 3/3677
 345/94
2014/0340291 A1* 11/2014 Wang .................. G09G 3/3696
 345/87

FOREIGN PATENT DOCUMENTS

| CN | 102314846 A | 1/2012 |
| CN | 102956215 | 3/2013 |
| CN | 103247280 | 8/2013 |
| CN | 103413534 | 11/2013 |
| CN | 10575410 A | 4/2015 |
| CN | 105590610 | 5/2016 |
| KR | 10-2001-0112807 A | 12/2001 |

* cited by examiner

CORNER CUT CIRCUIT IN LIQUID CRYSTAL PANEL DRIVING SYSTEM

CROSS-REFERENCE TO RELATED APPLICATION

This application is the U.S. national phase of PCT Application No. PCT/CN2016/081200 filed on May 6, 2016, which claims priority to CN Patent Application No. 201610155912.5 filed on Mar. 18, 2016, the disclosures of which are incorporated in their entirety by reference herein.

TECHNICAL FIELD

The present invention overall relates to a liquid crystal panel driving field, more specifically speaking, especially relates to a corner cut circuit in a liquid crystal panel driving system.

BACKGROUND ART

In order to improve uniformity of a liquid crystal panel (LCD), a feedback voltage and a linear-changing effect need to be reduced. Generally, in a driven architecture of the existing LCD, in order to reduce the feedback voltage and the linear-changing effect, a corner cut circuit may be added in a driving system of the LCD, and a slope of the drive voltage waveform is adjusted through the corner cut circuit (i.e., generating a corner cut/chamfer). Since a corner cut voltage of the existing corner cut circuit is fixed, the corner cut voltage can be adjusted only through a method of adding a peripheral circuit and altering a peripheral resistance (as shown in FIG. 1). However, such a method not only enables peripheral circuit wiring to be relatively complicated, but also increases a cost of the corner cut circuit.

SUMMARY

On this account, a purpose of the present invention is to provide a corner cut circuit in a liquid crystal panel driving system to overcome the existing defects of relatively complicated peripheral circuit wiring of a power management chip and a relatively high cost due to a method of adjusting a corner cut voltage through arranging a peripheral resistance outside of the power management chip.

An exemplary embodiment of the present invention provides a corner cut circuit in a liquid crystal panel driving system, which is characterized by that: the corner cut circuit includes: a controller to provide a first signal for a signal converter; a signal converter to convert the first signal to a second signal for controlling discharging of a discharge circuit, and to provide the second signal to the discharge circuit; a discharge circuit to generate a corner cut voltage of a corner cut circuit according to the second signal provided by the signal converter.

Selectively, the discharge circuit includes a plurality of current sources in parallel and switches corresponding to each of the current sources to control turning on or turning off of the current sources, wherein each of the switches is turned on or turned off in response to the corresponding second signal, and output ends of the plurality of current sources in parallel are connected with each other to output the corner cut voltage of the corner cut circuit.

Selectively, the controller is a timing controller.

Selectively, the signal converter and the discharge circuit are disposed in the power management chip.

Selectively, the controller provides the first signal to the signal converter based on a parallel communication protocol.

Selectively, each of the first signals includes a clock signal and a data signal.

The corner cut circuit in a liquid crystal panel driving system provided according to the exemplary embodiment of the present invention can not only automatically adjust the corner cut voltage, but also simplify the peripheral circuit, and thereby reducing the cost.

BRIEF DESCRIPTION OF THE DRAWINGS

The above and other targets, features and advantages of exemplary embodiments of the present invention will become apparent from the following detailed description, taken in conjunction with the accompanying drawings in which.

DETAILED DESCRIPTION OF EXEMPLARY EMBODIMENTS

Figure 1:
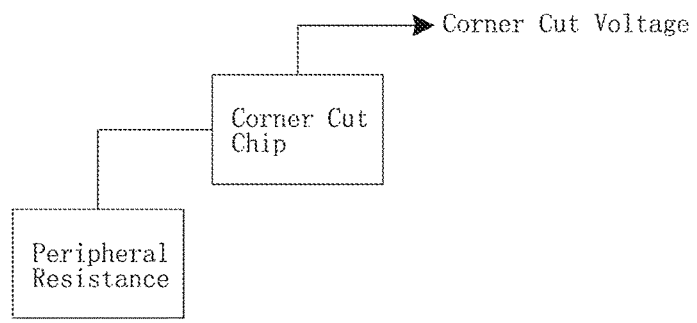
FIG. 1 illustrates a structure diagram of a peripheral circuit of a power management chip provided with a peripheral resistance in the prior art.

Here, different exemplary embodiments will be described more sufficiently with reference to the drawings, wherein some exemplary embodiments will be illustrated in the drawings, and wherein the same label consistently represents the same components.

Figure 2:
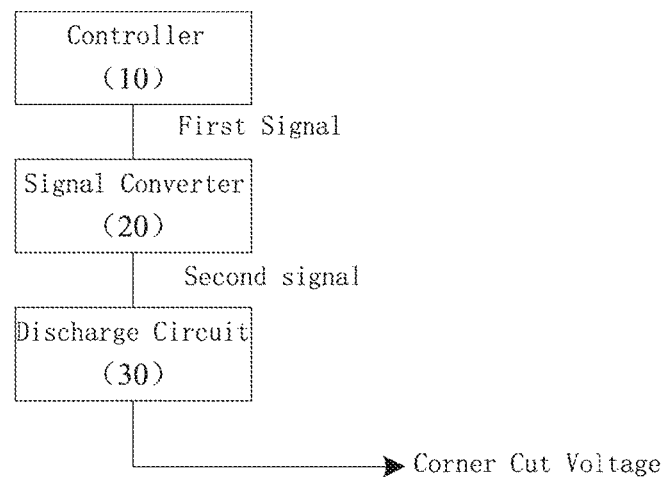
FIG. 2 illustrates a block diagram of a corner cut circuit in a liquid crystal panel driving system according to an exemplary embodiment of the present invention.

FIG. 2 illustrates a block diagram of a corner cut circuit in a liquid crystal panel driving system according to an exemplary embodiment of the present invention.

As illustrated in FIG. 2, the corner cut circuit in the liquid crystal panel driving system according to the present invention includes: a controller 10, a signal converter 20 and a discharge circuit 30.

Specifically speaking, the controller 10 is used to provide a first signal for the signal converter 20.

Here, the controller 10 may provide the first signal to the signal converter 20 based on a parallel communication protocol. When the controller 10 is a timing controller, each of the first signals may include a clock signal and a data signal, wherein the clock signal and data signal may be output respectively by a clock pin (SCL pin) and a data pin (SDA pin) of the timing controller.

The signal converter 20 is used to convert the first signal to a second signal for controlling discharging of a discharge circuit 30, and to provide the plurality of second signals to the discharge circuit 30.

Herein, as an example, the signal converter 20 may convert the first signal to a second signal for controlling discharging of the discharge circuit 30. Specifically speaking, when interfaces (such as, a SCL pin and a SDA pin) of the signal converter 20 receive a first signal, the first signal may be parsed as a second signal. For instance, when both the clock signal and the data signal in the first signal are 1, the signal converter 20 may parse the first signal as a high level signal. Likewise, when a plurality of first signals is received in chronological order, the signal converter 20 may parse out second signals corresponding to each of the first signals. Here, it should be understood that the signal converter 20 may be formed by any existing element that can achieve the above functions.

The discharge circuit 30 is used to generate a corner cut voltage of a corner cut circuit according to the second signal provided by the signal converter 20.

As an example, the discharge circuit 30 may include a plurality of current sources in parallel and switches corresponding to each of the current sources to control ON or OFF of the current sources, wherein each of the switches is turned on or turned off in response to the corresponding second signal, and output ends of the plurality of current sources in parallel are connected with each other to output the corner cut voltage of the corner cut circuit. Here, as an example, the switches corresponding to each of the current sources may be field-effect tubes, such as a NMOS transistor, a PMOS transistor, and the like, served as electronic switches. Specifically speaking, when the switch is turned ON, the current source corresponding to the switch turned on is discharged so that the corner cut voltage of the corner cut circuit is changed. For instance, when the switch is a NMOS transistor, the switch is turned ON when receiving a high level signal. The current source connected in series with the NMOS transistor turned on discharges so that the corner cut voltage of the corner cut circuit is changed.

Through the above method, the corner cut voltage may be automatically adjusted.

Figure 3:
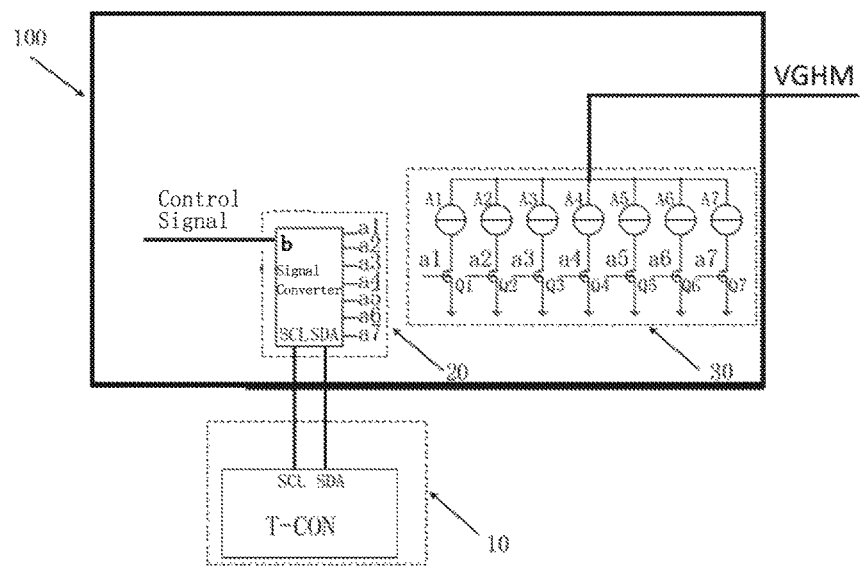
FIG. 3 illustrates an example of a corner cut circuit in a liquid crystal panel driving system according to an exemplary embodiment of the present invention.

FIG. 3 illustrates an example of a corner cut circuit in a liquid crystal panel driving system according to an exemplary embodiment of the present invention.

Referring to FIG. 3, as an example, the signal converter 20 and a discharge circuit 30 may be disposed in a power management chip 100. Specifically speaking, the discharge circuit 30 in a corner cut circuit may include a plurality of current sources. For instance, the discharge circuit 30 in the corner cut circuit in FIG. 3 includes seven current sources A1-A7 in parallel, which may be more or less of course, but at least more than two. Each of the current sources is connected with a switch in series. As an example, the switch is a NMOS transistor. Control ends of each of the switches (i.e., Q1-Q7) are connected with output pins a1-a7 corresponding to the signal converter 20, respectively. For example, an a1 output pin of the signal converter 20 is connected with a control end of a switch Q1 corresponding to the current source A1. In addition, a master output line (i.e., the master output line formed after connecting a plurality of output ends of the plurality of current sources in parallel with each other) of the discharge circuit 30 including current sources A1-A7 may be connected with an output end VGHM of the corner cut voltage of the power management chip 100. In addition, as an example, a controller 10 may be disposed outside the power management chip 100. Here, in a case where the controller 10 is a timing controller T-CON, a clock pin and a data pin of the signal converter 20 are connected with a clock pin and a data pin of the timing controller T-CON. A control switch pin b of the signal converter 20 is used to receive a control signal.

A working principle of a corner cut circuit in a liquid crystal panel driving system according to an exemplary embodiment of the present invention is described below.

Specifically speaking, the timing controller T-CON may perform a programmed control to the signal converter 20 in the power management chip 100 through parallel communication methods. For example, the timing controller T-CON may send a first signal to the signal converter 20 through a clock pin and a data pin based on a user setting. The signal converter 20 receives the first signal sent by the timing controller T-CON through the clock pin and the data pin when receiving a control signal, and parses the first signal. For instance, when a clock signal and a data signal included in the first signal are 1, the signal converter 20 may parse the first signal as a high level signal. Likewise, when there are a plurality of (like seven) first signals, the signal converter 20 may parse the plurality of first signals as a plurality of second signals controlling switches connected with the current sources in series in chronological order. Here, as an example, the signal converter 20 may store the plurality of parsed second signals controlling switches connected with the current sources in series. When reaching a predetermined number (like seven), the plurality of second signals are provided to the switches connected with each of the current sources in series in the discharge circuit 30 so that each of the switches is turned ON or turned OFF in response to the corresponding signals, thus outputting a corner cut voltage of the corner cut circuit.

Figure 4:
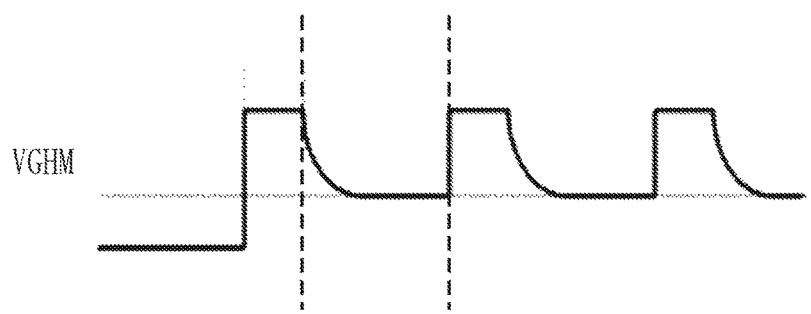
FIG. 4 illustrates a timing diagram of a corner cut voltage according to an exemplary embodiment of the present invention.

FIG. 4 illustrates a timing diagram of a corner cut voltage according to an exemplary embodiment of the present invention.

Since a discharge circuit 30 receives a plurality of second signals at a time to form a discharge slope, the discharge slope may be changed again when a plurality of second signals are received again. Certainly, it can be concluded that more or even a rounded corner close to an arc shape may be formed through sending the second signals more times, as shown in FIG. 4. The discharge slope will not be changed when reaching to a certain degree.

Figure 5:
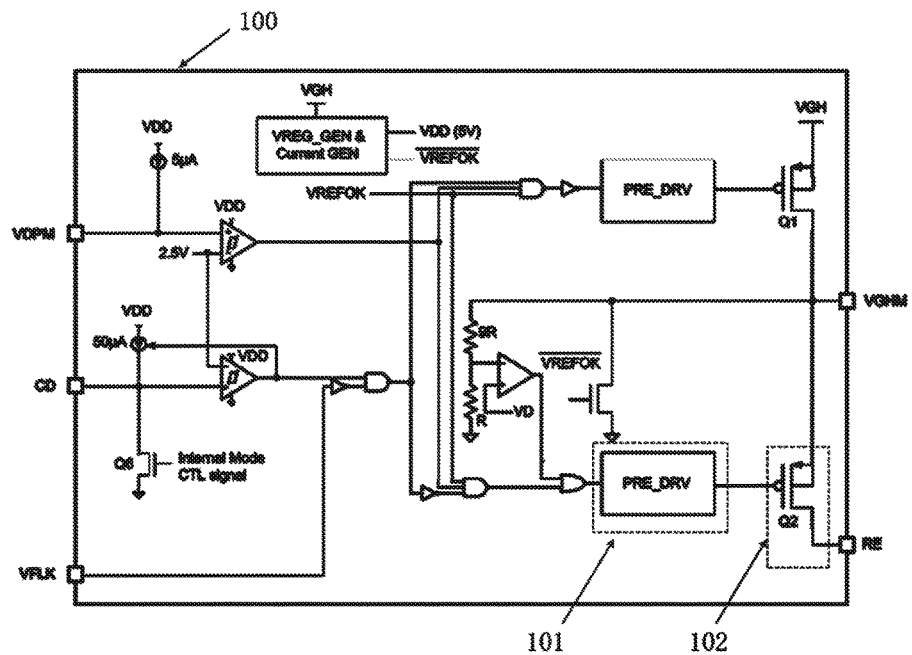
FIG. 5 illustrates an inside block diagram of a power management chip with a model as HX5562R11U in the prior art.
Figure 6:
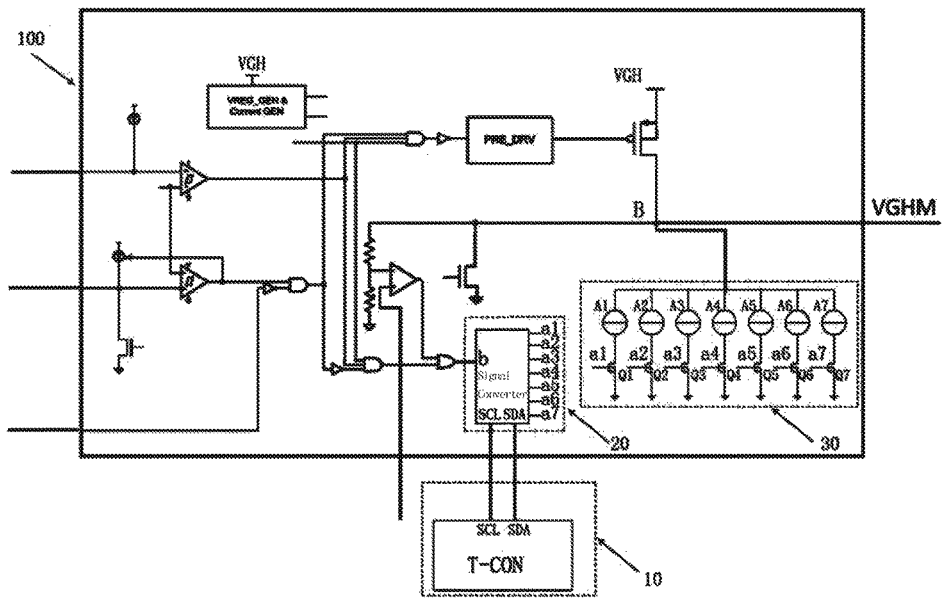
FIG. 6 illustrates an example of a corner cut circuit in a liquid crystal panel driving system according to an exemplary embodiment of the present invention.

An example of the corner cut circuit applied in a power management chip 100 with a model as HX5562R11U will be described in detail hereinafter. FIG. 5 illustrates an inside block diagram of a power management chip 100 with a model as HX5562R11U in the prior art. FIG. 6 illustrates an example of a corner cut circuit in a liquid crystal panel driving system according to an exemplary embodiment of the present invention.

Referring to FIG. 5 and FIG. 6, as an example, a signal converter 20 and a discharge circuit 30 can replace a driving circuit PRE_DRV 101 and a PMOS transistor Q2 102 in FIG. 2. In addition, a controller 10 is disposed outside a power management chip 100. Here, the controller 10, the signal converter 20 and the discharge circuit 30 are the same as those in FIG. 3. Specifically speaking, a clock pin and a data pin of the signal converter 20 are respectively connected with a clock pin and a data pin of a timing controller T-CON. A control switch pin b of the signal converter 20 is connected with an output end of an or gate circuit. Output ends of the switches corresponding to each of the current sources in parallel in the discharge circuit 30 are connected with the output pin of the signal converter 20. A master output line of the discharge circuit 30 is connected with a node B. Here, it should be noted that the present invention is not limited thereto. The connection relationship of elements of other circuits in FIG. 6 is the same as the connection relationship of elements in FIG. 5 in the prior art, which are omitted here. In addition, it should be understood that the power management chip 100 can also be other power management chip other than the chip with a model as HX5562R11U.

In summary, the corner cut circuit in a liquid crystal panel driving system provided according to the exemplary embodiment of the present invention can not only automatically adjust the corner cut voltage, but also simplify the peripheral circuit, and thereby reducing the cost.

Obviously, the protection scope of the present invention is not limited to the above detailed modes of carrying out the invention, and those skilled in the art may make various changes and modifications to the invention without departing from the scope and spirit of the invention. As such, if these changes and modifications of the present invention belong to the scope of the claims of the present invention and equivalent technologies thereof, the present invention also intends to include these changes and modifications here.

What is claimed is:

1. A corner cut circuit in a liquid crystal panel driving system, wherein the corner cut circuit comprises:
    a controller providing a first signal; and
    a signal converter coupled to the controller and converting the first signal to a second signal for controlling discharging of a discharge circuit, and providing the second signal to the discharge circuit,
    wherein the discharge circuit generates a corner cut voltage of the corner cut circuit according to the second signal provided by the signal converter, and
    wherein the discharge circuit includes a plurality of current sources in parallel and switches corresponding to each of the current sources to control turning on or turning off the current sources, wherein each of the switches is turned on or turned off in response to a corresponding second signal, and output ends of the plurality of current sources in parallel are connected with each other to output the corner cut voltage of the corner cut circuit.

2. The corner cut circuit of claim 1, wherein the signal converter converts a plurality of first signals to a plurality of second signals and stores the plurality of second signals; when the number of the plurality of second signals reaches the number of the switches, the plurality of second signals are provided to the switches.

3. The corner cut circuit of claim 2, wherein the controller is a timing controller.

4. The corner cut circuit of claim 2, wherein the signal converter and the discharge circuit are disposed in a power management chip.

5. The corner cut circuit of claim 2, wherein the controller provides the first signal to the signal converter based on a parallel communication protocol.

6. The corner cut circuit of claim 2, wherein each of the first signals includes a clock signal and a data signal.

7. A liquid crystal panel driving system, comprising a corner cut circuit, wherein the corner cut circuit comprises:
    a controller providing a first signal; and
    a signal converter coupled to the controller and converting the first signal to a second signal for controlling discharging of a discharge circuit, and to provide the second signal to the discharge circuit,
    wherein the discharge circuit generating a corner cut voltage of the corner cut circuit according to the second signal provided by the signal converter, and
    wherein the discharge circuit includes a plurality of current sources in parallel and switches corresponding to each of the current sources to control turning on or turning off the current sources, wherein each of the switches is turned on or turned off in response to a corresponding second signal, and output ends of the plurality of current sources in parallel are connected with each other to output the corner cut voltage of the corner cut circuit.

8. The liquid crystal panel driving system of claim 7, wherein the signal converter converts a plurality of first signals to a plurality of second signals and stores the plurality of second signals; when the number of the plurality of second signals reaches the number of the switches, the plurality of second signals are provided to the switches.

9. The liquid crystal panel driving system of claim 8, wherein the controller is a timing controller.

10. The liquid crystal panel driving system of claim 8, wherein the signal converter and the discharge circuit are disposed in a power management chip.

11. The liquid crystal panel driving system of claim 8, wherein the controller provides the first signal to the signal converter based on a parallel communication protocol.

12. The liquid crystal panel driving system of claim 8, wherein each of the first signals includes a clock signal and a data signal.

* * * * *